United States Patent [19]
Brown

[11] Patent Number: 5,133,111
[45] Date of Patent: Jul. 28, 1992

[54] CAM CLEAT

[76] Inventor: Michael A. Brown, 434 Triangle Ave., Oakwood, Ohio 43078

[21] Appl. No.: 765,999

[22] Filed: Sep. 26, 1991

[51] Int. Cl.⁵ .................. A44B 21/00; F16G 11/00
[52] U.S. Cl. ........................ 24/134 R; 24/134 KB; 24/132 WL
[58] Field of Search ...... 24/134 R, 134 KB, 132 AA, 24/132 WL; 403/374

[56] References Cited

U.S. PATENT DOCUMENTS

| | | | |
|---|---|---|---|
| 334,878 | 1/1886 | Manners | 24/134 R |
| 2,080,700 | 5/1937 | Dale | 24/134 R |
| 2,238,386 | 4/1941 | Frank | 24/134 R |
| 2,836,870 | 6/1958 | Shea | 24/134 KB |
| 3,256,579 | 6/1966 | Hoover | 24/134 R |
| 3,852,943 | 12/1974 | Healy | 24/134 R |
| 4,071,926 | 2/1978 | Sweet et al. | 24/134 KB |
| 4,308,643 | 1/1982 | Montplaisir | 24/132 AA |
| 4,716,630 | 1/1988 | Skyba | 24/134 KB |

*Primary Examiner*—Victor N. Sakran
*Attorney, Agent, or Firm*—R. William Graham; H. Stanley Muir

[57] ABSTRACT

This invention relates to a cam cleat device for use in gripping rope, lines, or the like. The device includes a base plate having a rope receiving surface portion along and against which the rope travels, a cam pivotally connected to the base plate, and a plurality of protrusions extending generally radially outwardly from the surface of the cam. The protrusions provide an improved bite when in operation so as to prevent rotational as well as translational movement of the rope when gripped.

15 Claims, 1 Drawing Sheet

CAM CLEAT

BACKGROUND OF THE INVENTION

This invention relates to cam cleat devices used to grip rope, lines, or the like. More particularly, but not by way of limitation, this invention relates to a cam cleat device for securely holding or gripping a rope having slight tension exerted thereon.

Cam cleat devices have been used in a wide range of applications for gripping or securing rope, lines or the like, hereafter simply referred to as rope, to prevent translational movement. As examples, cam cleat devices have been used to secure sailing ropes and mountian climbing ropes so that they do not move with respect to a reference position. When used for sailing and climbing, rope tension typically ranges from hundreds to thousands of pounds. In contrast, cam cleat devices are also used as part of therapeutic devices which hang or suspend a patient or a part of a patient's body. In therapeutic applications, rope tension typically varies from several pounds to hundreds of pounds.

Simplistically, a cleat device traps a rope between the end of a rotating arm and a stationary surface located a fixed distance from the axis of the rotating arm. When the rope is in tension relative to the cleat device, the pressure of both the end of the rotating arm and the stationary surface against the rope will restrain axial translation of the rope through the cleat device provided the diameter of the rope at the point contacted by the end of the rotating arm remains greater than the distance of closest proximity between the end of the rotating arm and the stationary surface of the cleat device.

A cam cleat device improves upon the design of the cleat device by substituting for the rotating arm a cam having an arcuate surface eccentrically disposed relative to the axis of rotation of the cam. The arcuate surface provides a greater contact area between the cam and the rope while the eccentric positioning of the arcuate surface compensates for changes in the rope diameter which may be caused by the relative tension placed on the rope.

The arcuate surface of the cam cleat can be smooth, ribbed or toothed. The toothed or ribbed surfaces are in the form of numerous teeth or ribs generally situated in parallel rows along the arcuate surface of the cam cleat with the rows running in a direction other than parallel to the direction of rope translational movement. Such surfaces are thought to aid in gripping the rope to restrain translational movement of the rope relative to the cam cleat device and to aid in removal of debris, such as ice or dirt, from the rope.

The cam cleat device is typically spring-loaded to force the cam cleat to rotate in the direction in which the distance between the arcuate surface and the stationary surface decreases (positive cam rotation). Increasing the tension of the rope relative to the cam cleat device pulls the cam in the direction of positive cam rotation causing the cam cleat device to grip the rope more tightly.

In order to release the rope to permit it to translate through the cam cleat device, the cam must be rotated in the direction in which the distance between the arcuate surface and the stationary surface increases (negative cam rotation). This is normally accomplished by reducing or reversing the direction of the tension on the rope with respect to the cam cleat device. However, release of cam cleat devices is known to occur with no apparent change in relative tension, particularly in activities of low, or slight rope tension, such as therapeutic devices.

There is therefore a need for a cam cleat device which overcomes this problem. The present invention is set forth below and solves the problem.

SUMMARY OF INVENTION

This invention discovers that the grip of a cleat device against a rope can be overcome by rotation of the cam cleat device circumferentially about and relative to the rope being gripped and also discovers that release of tire grip of a cleat device can be avoided if such relative rotation is inhibited.

The present invention provides a cam cleat device having a bite (defined hereinafter) which prevents translational and rotational movement of the cam cleat device relative to a rope when in operation. The improved bite prevents release of a rope by a cam cleat device when little force and twisting is applied thereto.

Accordingly, the present invention is directed to an improved cam cleat device for receiving and gripping a rope, comprising a baseplate having a rope receiving surface portion along and against which a rope travels, and a cam pivotally connected to the base plate. The cam has a plurality of protrusions which extend generally radially outwardly from surface of the cam. The protrusions are of a predetermined spacing from one another and are of a predetermined size and length to effect a bite into the rope when the rope rides against the surface. In a preferred embodiment, the cam is spatially positioned from the rope receiving surface and has an arcuate surface eccentrically disposed from the cam pivot point toward the rope receiving surface such that, when rotated in the direction of positive cam rotation, the distance between the arcuate surface and the rope receiving surface decreases. Also included are means for biasing the cam cleat toward the rope receiving surface portion so that the protrusions contact the rope.

DEFINITIONS

The term "bite", as used with respect to the present invention, shall refer to a particular contact between the protrusions and the rope when the cam is biased toward the rope receiving surface, wherein the protrusions extend substantially into the rope to form the effective connecting surface between the cam cleat and the rope and create a binding effect in the rope to prevent both translational and rotational movement. While other portions of the arcuate surface, for example, the presence of teeth or ribs, or an increase in the plurality, configuration or relative position of the protrusions, may contribute to bite in either the radial or axial direction, it has been discovered that too much interaction between portions of the arcuate surface with the surface of the rope in a reduction of bite in the other direction.

DETAIL DESCRIPTION OF THE PREFERRED EMBODIMENT

Figure 1:
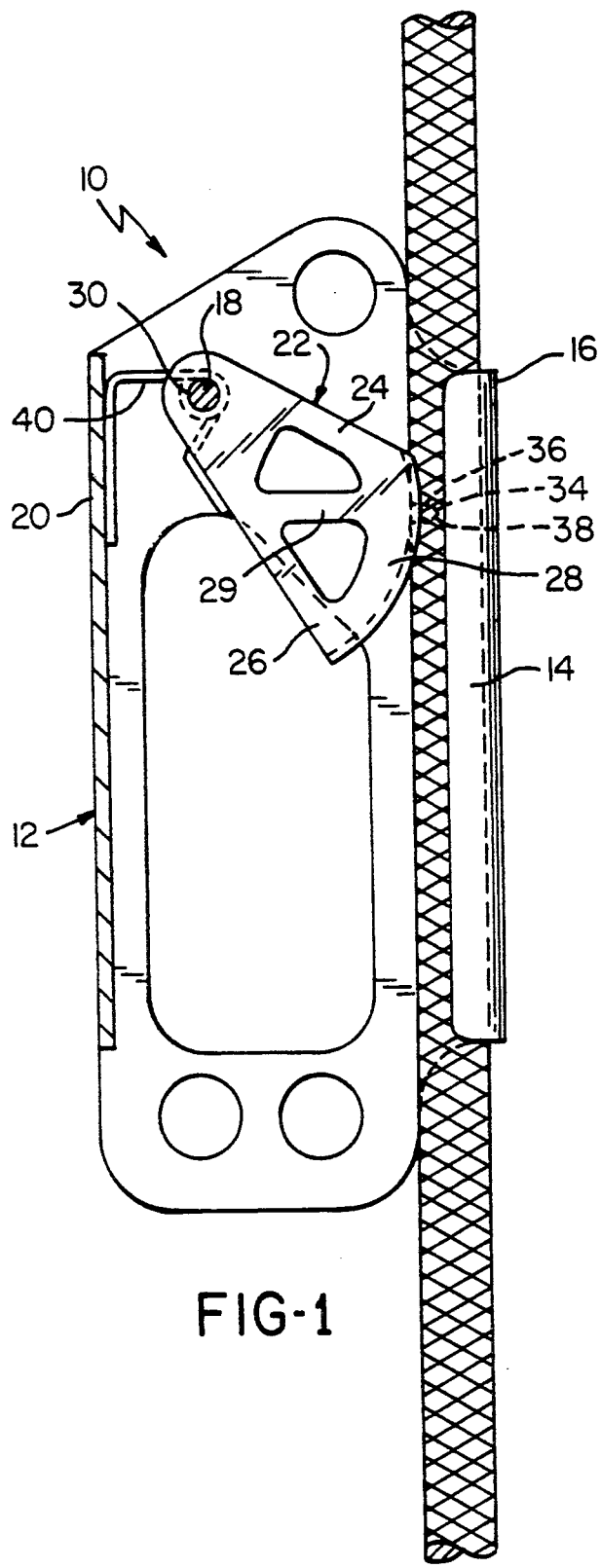
FIG. 1 is a side view.

The cam cleat device 10 is shown in FIG. 1. The device 10 includes a baseplate 12. The baseplate 12 has a generally semicircular flange portion 14 rolled along end 16 generally perpendicular to baseplate 12. Alternatively, flange portion 14 can be rolled such that, in addition to the semicircular portion along end 16, there is a straight portion extending parallel to baseplate 12 toward end 20. A pivot pin 18 connted to the baseplate 12 adjacent end 20 extends perpendicularly from the baseplate 12 on the same side as flange portion 14.

A cam 22 of generally triangular shape includes intersecting sides 24 and 26, and an arcuate portion 28 as its hypotenuse. A support portion 29 extends from arcuate portion 28 to side 26. The cam 22 has a bore 30 at a point proximate to where the sides 24 and 26 intersect. The bore 30 is adapted to receive pin 18 therethrough so that the cam 22 is pivotally connected to the pin 18. Side 24 is of shorter length than side 26 so that the arcuate portion 28 is slightly eccentric to the cam 22 pivot axis allowing the closest proximate distance from arcuate portion 28 to side 16 to decrease as cam 22 is pivoted in a counterclockwise direction, the direction of positive cam rotation as shown in FIG. 1, and to increase as cam 22 is pivoted in a clockwise direction, the direction of negative cam rotation.

Figure 2:
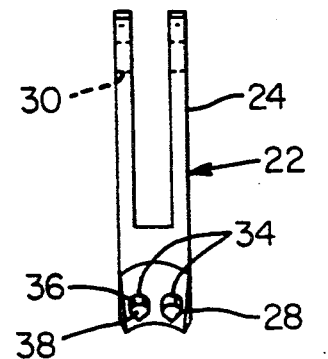
FIG. 2 is a top view.

The arcuate portion 28 has an arcuate surface 32 (see FIG. 2). A pair protrusions 34 extend generally perpendicualr to surface 32 and are placed on a line generally perpendicular to the plain of cam rotation. The protrusions 34 are of predetermined spacing from each other, are of a predetermined size and length, and are positioned a predetermined distance from the point of intersection of side 22 and arcuate surface 32 to bite a rope in flange 14 when cam 22 is rotated in the direction of positive cam rotation about pin 18, as shown in FIG. 1. The size and location of protrusions 34 are dependent, among other things, upon the diameter of the rope and the closet proximate distance between arcuate surface 32 and side 16.

Generally, for a rope having a diameter between about 0.315 inch (0.800 cm) to 0.551 inch (1.399 cm), the protrusions should have a length and diameter of about 0.125+/−0.303 inch (0.3175 cm +/−0.076) and 0.156+/−0.030 inch (0.395 cm +/−0.076), respectively. The protrusions should be spaced about 0.300 inch (0.228 cm) from center to center.

The protrusions 34 each have a generally cylindrical base 36 which extends outward from the surface 32 and terminates in a substantially conical end 38. The conical end 38 is shaped to allow penetration of the rope with substantially no damage occuring to the rope. The cylindrical base 36 at least partially penetrates the rope to effectively prevent rotational as well as translational movement of the rope. Ideally, the protrusions are transversely spaced on the arcuate surface to keep the rope centrally positioned between the flange portion 14 and the arcuate surface 32.

A spring 40 is disposed around the pin 18 which forces the cam 22 toward the semicircular end 16 of flange portion 14 and flange portion 14 extends over pin 18 with a bore 30 through which pin 18 likewise extends.

A rope is typically constructed by dundling the fibers or filaments of the materials making up the rope and wrapping, weaving, twisting or otherwise positioning, them in bundles so that they retain a generally cylindrical configuration, having a relatively constant diameter along the length of the rope. The outer surface of the rope, whether woven or twisted, takes on a characteristic pattern not unlike a screw thread. Herein lies the basis for release of a cam cleat device which should otherwise continue to grip a rope in tension relative thereto.

Cams which do not have sufficient bite to prevent rotation of the cam cleat device circumferentially about the rope surface become much like a nut threaded on a bolt. If the cam circles the rope following its screw thread-like surface in a direction generally opposite from positive cam rotation, the tension on the rope can be overcome by the rotational torque of the cam cleat device causing the cam to rotate in the direction of negative cam rotation and track down along the rope surface increasing the distance between the stationary and arcuate surfaces of the cam cleat device. Such movement causes the grip of the cam cleat device to be reduced and permits translation of the rope through the cam cleat device in the direction of reducing tensile load.

Current cam cleat arcuate surfaces use profiles and protrusions which anticipate and attempt to limit axial translation of the rope relative to the cam cleat device. However, such profiles and protrusions are not sufficient to overcome rotation of the cam cleat device about the circumference of the rope. Further, the ribbed or threaded profile of such profiles and protrusions increases tracking of the cam cleat about the circumference of the rope since they act as "threads" fitting into and following the "grooves" of the rope.

The present invention provides a cam cleat device which safely and securely grips and holds a rope having slight tension with respect to the cam cleat device, as in therapeutic devices in the medical field, for example. The cam cleat device also safely and securely grips and holds a rope having substantial tension thereon relative to the cam cleat device. The present invention also provides an improved cam cleat device displaying improved holding capability.

The bite firmed by the cam cleat device of the present invention prevents translational movement of rope. In addition, this bite exhibits a feature uncharacteristic of previous designs notably when operating under little tension in that the bite prevents rotational movement commonly associated with previous designs. The present invention therefore provides a novel cam cleat device which, through the unique bite, prevents unwanted rotational as well as translational movement of the rope.

The following Table, entitled Comparison of Cleat Release with Rope Rotation, illustrates the advantages of the present invention over previous designs. The Table shows the number of rotations which are required to disconnect a particular cam cleat device from a rope with a set tension between the cam cleat device and the rope, wherein the cam cleat devices differ in their respective arcuate cam surfaces. The rope used for the comparison was of the "Kern Mantel" type having a diameter between 0.315 inch (0.8 cm) and 0.551 (1.39 cm). For an effective bite for the diameter rope tested, the surface of the present invention includes a pair of protrusions having a length of about 0.125 inch (0.317 cm) a diameter of about 0.125 inch (0.317 cm) and 0.290 inch (0.736 cm) spacing from center to center. The toothed, ribbed and smooth surfaces which were tested are ones typically known in the art as described above.

TABLE

Comparison of Cleat Release with Rope Rotation

| ARCUATE CAM SURFACE: WEIGHT lbs. | TOOTH OR RIBBED # rot. | SMOOTH # rot. | PROTRUSION # rot. |
|---|---|---|---|
| 0 | 0.25 | 0.25 | * |
| 20 | 1-3 | 1-3 | * |
| 60 | 9-14 | 9-14 | * |

*In none of the tested cases did the surface of the present invention disconnect from the rope upon rotationg the rope.

The present invention has been set forth above in a specific embodiment. However, it is conceived that modifications, derivations and alterations will be readily apparent to those skilled in the art and the present invention should enjoy the benefit of such variations.

What is claimed is:

1. An improved cam cleat device and a rope, said cam cleat receiving and gripping said rope having slight and/or great tension exerted thereon, said rope constructed of wrapped, woven or other intertwining of fibers resulting in a spiral characteristic from end to end much like screw threads, comprising:

a baseplate having a rope receiving surface portion; and a cam pivotally connected to said baseplate and having a surface, said cam having a pair of protrusions generally radially outwardly extending from said surface toward said rope wherein said protrusions are of a predetermined size and length said protrusions each having a base and an outer end, said outer end having a different configuration than said base, said protrusions forming effective connecting surfaces between said cam cleat and the rope and create a binding effect in the rope by penetrating an outer surface of said rope such that each of said outer end of said protrusions and a portion of each of said base of said protrusions extend inwardly from said outer surface of said rope to disrupt the otherwise screw thread-like interaction between the spiral characteristic of the rope fibers and the other contact surfaces of said cam to prevent translational and rotational movement with substantially no damage occurring to said rope.

2. The cam cleat device of claim 1, which further comprises means for biasing said cam cleat toward said rope receiving surface portion so that said protrusions contact the rope.

3. The cam cleat device of claim 1, wherein said surface of said cam is arcuate and slightly eccentric about the pivot axis of said cam.

4. The cam cleat device of claim 1, wherein said base is generally cylindrical and wherein said outer end is generally conical.

5. The cam cleat device of claim 1, wherein said protrusions extend generally normal to said surface of said cam.

6. The cam cleat device of claim 1, wherein said protrusions are transversely spaced on said surface of said cam to effect centering of a rope against said rope receiving surface portion.

7. The cam cleat device of claim 1, wherein said protrusions are along a line perpendicular to the plane of cam rotation.

8. An improved cam cleat device and a rope which is particularly useful in the medical field for suspending relatively lightweight objects from said rope which is constructed of fibers in a wrapped or woven fashion resulting in a spiral characteristic from end to end much like the threads on a screw, comprising:

a baseplate having a rope receiving surface portion; and a cam pivotally connected to said baseplate and having an arcuate surface, said cam having a pair of protrusions generally radially outwardly extending from said arcuate surface, wherein said protrusions have a generally cylindrical base and terminate in a generally conical end and are of a predetermined spacing from one another and are of a predetermined size and length to form an effective primary connecting surface shaped to allow penetration of the rope with substantially no damage occurring to the rope and to create a binding effect at the two contact points to disrupt the otherwise screw thread-like interaction between the spiral characteristic of the rope fibers and the other contact surfaces of said cam to prevent translational and rotational movement.

9. The cam cleat device of claim 8, which further includes means for biasing said cam cleat toward said rope receiving surface portion so that said protrusions contact the rope.

10. The cam cleat device of claim 8, wherein said arcuate surface is slightly eccentric to the pivot axis of the cam.

11. The cam cleat device of claim 8, wherein said rope receiving surface is a flange which extends generally perpendicular from said baseplate and having a concave aspect shaped to the rope.

12. The cam cleat device of claim 8, wherein said arcuate surface has another protruded surface aspect to further prevent translational motion.

13. An improved cam cleat device and a rope, said cam cleat receiving and gripping said rope having slight and/or great tension exerted thereon, comprising:

a baseplate having a rope receiving surface portion; and a cam pivotally connected to said baseplate such that said cam rotates in a plane parallel to said baseplate and having an arcuate surface slightly eccentricly displaced about the pivot axis of said cam, said cam having a pair of protrusions extending generally radially outwardly from said arcuate surface toward said rope receiving surface portion wherein said protrusions are of a predetermined spacing from one another and are of a predetermined size and length said protrusions each having a base and an outer end, said outer end having a different configuration than said base, said protrusion forming an effective primary connecting surface between said cam cleat and the rope by penetrating an outer surface of said rope such that each of said outer end of said protrusions and a portion of each of said base of said protrusions extend inwardly from said outer surface of said rope with substantially no damage occurring to the rope and create a binding effect in the rope to prevent translational and rotational movement.

14. The cam cleat device of claim 13, which further comprises means for biasing said cam cleat toward said rope receiving surface portion so that said protrusions contact said rope.

15. The cam cleat device of claim 13, wherein said protrusions have a generally cylindrical base and a generally conical outer end, extend generally normal to said arcuate surface, are transversely spaced on said arcuate surface to effect centering of a rope against said rope receiving device, and form a line perpendicular to the plane of rotation of said cam.

* * * * *